United States Patent
Scattergood

(10) Patent No.: US 8,866,675 B2
(45) Date of Patent: Oct. 21, 2014

(54) SPATIAL STRUCTURE WITH A TRANSPONDER AND METHOD FOR THE MANUFACTURE THEREOF

(75) Inventor: Martin Scattergood, Dusseldorf (DE)

(73) Assignee: SES RFID Solutions GmbH, Dusseldorf (DE)

( * ) Notice: Subject to any disclaimer, the term of this patent is extended or adjusted under 35 U.S.C. 154(b) by 522 days.

(21) Appl. No.: 12/990,973

(22) PCT Filed: Mar. 25, 2009

(86) PCT No.: PCT/EP2009/002166
§ 371 (c)(1),
(2), (4) Date: Nov. 4, 2010

(87) PCT Pub. No.: WO2009/135567
PCT Pub. Date: Nov. 12, 2009

(65) Prior Publication Data
US 2011/0057846 A1    Mar. 10, 2011

(30) Foreign Application Priority Data
May 7, 2008 (DE) .................. 10 2008 022 711

(51) Int. Cl.
   *H01Q 1/38*         (2006.01)
   *H01Q 7/00*         (2006.01)

(52) U.S. Cl.
   USPC ............... 343/700 MS; 343/866; 343/870

(58) Field of Classification Search
None
See application file for complete search history.

(56) References Cited

U.S. PATENT DOCUMENTS

| | | | | |
|---|---|---|---|---|
| 5,598,032 A | * | 1/1997 | Fidalgo | 257/679 |
| 6,028,557 A | * | 2/2000 | Oka | 343/713 |
| 6,262,682 B1 | * | 7/2001 | Shibata | 343/700 MS |
| 6,891,110 B1 | | 5/2005 | Pennaz | |
| 7,036,741 B2 | * | 5/2006 | Usami et al. | 235/492 |

(Continued)

FOREIGN PATENT DOCUMENTS

| | | |
|---|---|---|
| DE | 102006001777 A1 | 7/2007 |
| JP | 1994-286376 | 10/1994 |

(Continued)

OTHER PUBLICATIONS

English translation of the International Preliminary Report on Patentability dated Nov. 17, 2010.

(Continued)

*Primary Examiner* — Graham Smith
(74) *Attorney, Agent, or Firm* — Kilpatrick Townsend & Stockton LLP

(57) ABSTRACT

A spatial structure having a transponder comprising a planar antenna (6) and a chip (3) connected to the antenna (6), wherein the antenna (6) is at least partially embedded in a planar thermoplastic material (5) of the spatial structure, and a cavity is provided in the thermoplastic material (5) for partial holding the chip (3), wherein a planar module (1) is provided having a non-conducting substrate (2) that cannot be laminated with the thermoplastic material, the chip (3) being able to be connected to said module by way of an electrically conducting film, wherein the film forms contact areas (4a, 4b) for connecting the ends (7, 8) of the antennas (6) to the chip (3) on the module (1), and wherein the thermoplastic material (5) is laminated together with the module (1) and the antenna (6) between two cover layers (9, 10) in sandwich fashion, the contact areas (4a, 4b) of said module being aligned with the ends (7, 8) of the antenna (6).

14 Claims, 2 Drawing Sheets

(56) References Cited

U.S. PATENT DOCUMENTS

Figure 1A:
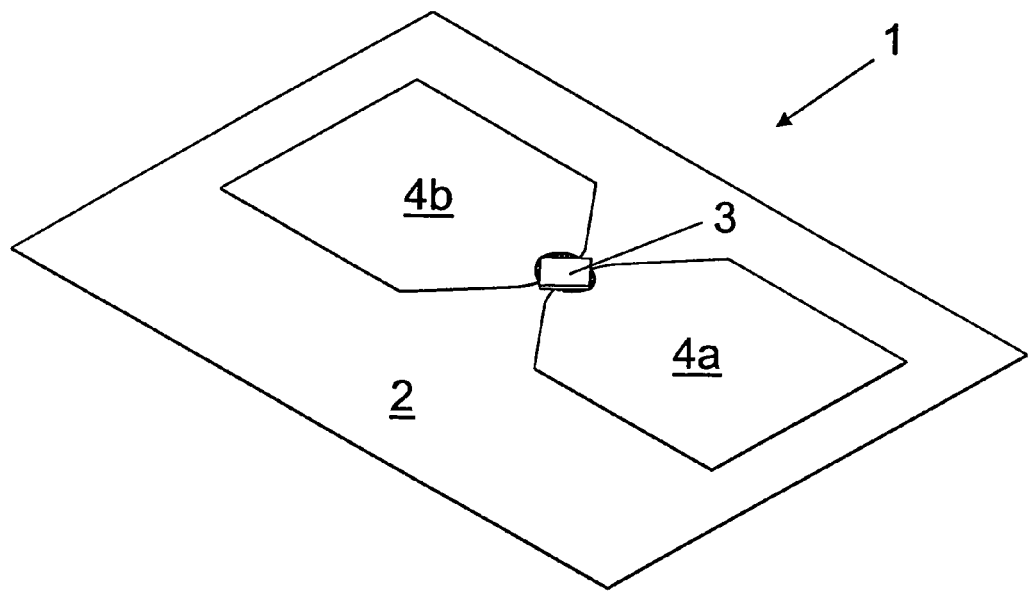

| | | | |
|---|---|---|---|
| 2005/0093677 A1 | 5/2005 | Forster | |
| 2005/0093678 A1* | 5/2005 | Forster et al. | 340/10.1 |
| 2009/0217515 A1* | 9/2009 | Aoyama et al. | 29/832 |

FOREIGN PATENT DOCUMENTS

| | | |
|---|---|---|
| JP | 08-230368 | 9/1996 |
| JP | 2001-513230 | 8/2001 |
| JP | 2002-279382 | 9/2002 |
| JP | 2003-067695 | 3/2003 |
| WO | WO2004/079646 A1 | 9/2004 |
| WO | WO 2004079646 A1 * | 9/2004 |
| WO | WO2005/048181 A1 | 5/2005 |

OTHER PUBLICATIONS

English translation of the Japanese Patent Application No. 2011-507797 Office Action issued Dec. 11, 2012 from the Japanese Patent Office.

Chinese Patent Application No. 2009801160842, filing date Mar. 25, 2009—Office Action with Search Report—pp. 1-7.

Chinese Patent Application No. 2009801160842, filing date Mar. 25, 2009—Third Office Action—pp. 1-8.

Japanese Patent Application No. 2011-507797—Japanese Office Action—pp. 1-3.

* cited by examiner

SPATIAL STRUCTURE WITH A TRANSPONDER AND METHOD FOR THE MANUFACTURE THEREOF

The invention relates to a spatial structure with a transponder and to a method for the manufacture thereof according to the preambles of claims 1 and 7, respectively.

A transponder with a chip and a coil as an antenna permits contactless access to a memory containing the chip. Transponders arranged in cards are used for example in conjunction with automated access controls as tickets, in conjunction with security information as passes and banking cards and in conjunction with the identification of origin as smart labels and tags.

DE 10 2006 001 777 A1 discloses a spatial structure with a transponder, in which structure a coil is embedded in a sheet-like thermoplastic material, and the ends of the coil are connected by way of solder contacts to a chip, which is arranged in a clearance in the sheet-like thermoplastic material.

A disadvantage of this is that the positioning of the chip for attaching the solder contacts with the alignment of the ends of the coil involves increased effort to produce the spatial structure and entails additional costs. Moreover, to form a thin sheet-like spatial structure, the size of the solder contact should be minimized, in order to obtain a flexible thin spatial structure.

The object of the invention is therefore to obtain a spatial structure according to the preamble of claim 1 and a process for the manufacture thereof according to the preamble of claim 7 in which a spatial structure with a transponder of high quality can be produced at low cost with little effort and in a thin form.

This object is achieved by the features of claim 1 and claim 7.

Obtained as a result is a spatial structure with a transponder in which the transponder has a sheet-like or planar antenna and a chip connected to the antenna, the antenna being at least partially embedded in a sheet-like thermoplastic material of the spatial structure. Arranged in the thermoplastic material is a clearance for at least partially receiving the chip in the thermoplastic material. A sheet-like module is provided, comprising an electrically nonconducting substrate that cannot be laminated with the thermoplastic material, on which the chip is connected to the substrate by way of an electrically conductive film. The electrically conductive film forms two contact areas for connecting the ends of the antenna to the chip. The flat-formed or sheet-like module is aligned by the contact areas with the ends of the antenna, so that each contact area covers one end of the antenna. The module provides large contact areas for the connection to the ends of the antenna that do not require exact positioning between a connection point on the chip and an end of the antenna. Moreover, a solder-free connecting process is obtained. The connection takes place by mechanical contact between a respective contact area and a respective end of the antenna, and a durable electrical connection is achieved. The thermoplastic material is (hot) laminated together with the placed-on antenna and the module between a respective outer layer or overlay on each side of the thermoplastic material. By the lamination, i.e. application of heat and pressure, the antenna is at least partially embedded in the thermoplastic material, and this produces a flat structure in which no elements are perceptible haptically, i.e. by feel, on account of the thin form of the connection, even if a spatial structure of a thickness of only approximately 300 µm is manufactured. Both the antenna and the chip with the connections to the antenna are not "perceptible by feel" in the spatial structure. The connection by way of the electrically conducting film does not create a hard element, such as for example a solder point, that can be felt with the fingers in a spatial structure of a thin form, which on account of its small thickness and the materials used is also flexible. The substrate of the module acts during the lamination as protection both for the chip and for the connecting area between the ends of the antenna and the contact areas of the module, since the substrate material cannot be laminated with the thermoplastic material and the outer layer or the overlay. In particular, the contact areas of the substrate are protected. By the once-only lamination, i.e. the once-only application of heat and pressure, moreover, the thermal and mechanical loading for the elements forming the transponder and the corresponding electrical connections is reduced and a high-quality composite with a low failure rate is manufactured. The thermoplastic material is fused with the two outer layers in a sandwich-like manner.

The electrically conductive film preferably comprises conductive silver paste, since this allows high electrical conductivity to be achieved, even of thin films. Even in a case where the film is formed with a thickness of "only" approximately 30 µm, an electrical connection between the chip and one end of the coil is possible.

To prevent lamination of the substrate of the module with the thermoplastic material and to protect the chip with the contact areas, the substrate of the module preferably consists of PET (polyethylene terephthalate), PI (polyimide), PV (PVDF, polyvinylidene fluoride) or a combination thereof.

For simple lamination with the two outer layers or the two overlays, the thermoplastic material comprises PVC (polyvinyl chloride), PETG (modified PET), PC (polycarbonate) or a combination thereof. The materials stated can be produced at low cost and in the form of a film.

Teslin, PVC, PETG, PC or the like can be used as the material for the outer layer. The outer layer preferably has a thickness between approximately 0.03 mm and approximately 0.25 mm, it being desirable for the outer layer or the overlay to be made even thinner. Particularly desirable are outer layers in the range between approximately 0.04 mm and 0.05 mm.

If PVC is used as the thermoplastic material, PVC is also preferably used for the outer layer or the overlay.

It has been found that thin spatial structures in card form have a high level of acceptance. The spatial structure, i.e. essentially the thermoplastic material, is therefore preferably given the form of a card and has a thickness of between 0.2 mm and 0.4 mm, in particular 0.3 mm. The flexible spatial structure in card form has no elements that are perceptible by feel, such as for example solder contacts, on account of the large contact areas that are formed by means of conductive silver paste.

Further refinements of the invention can be taken from the subclaims and the description which follows.

The invention is explained in more detail below on the basis of the exemplary embodiment that is represented in the accompanying figures.

Figure 1B:
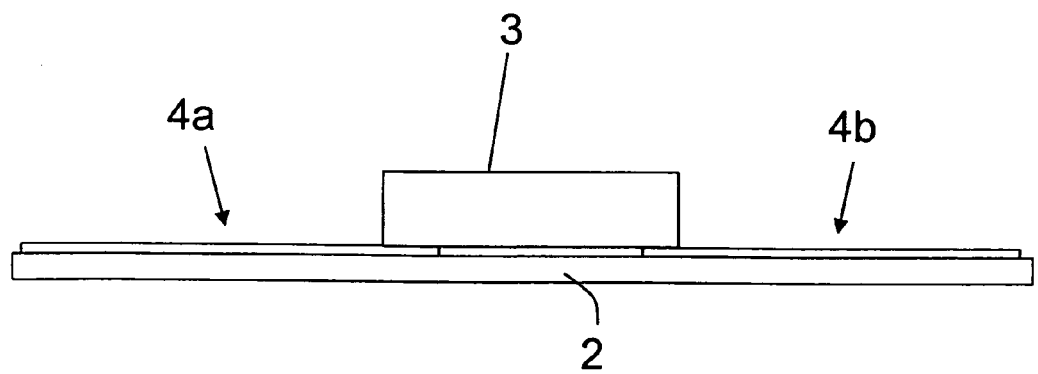
Figure 2:
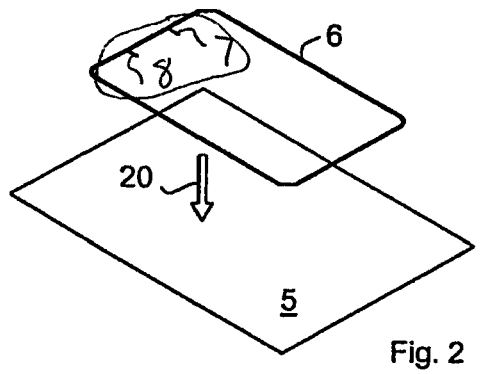
Figure 3:
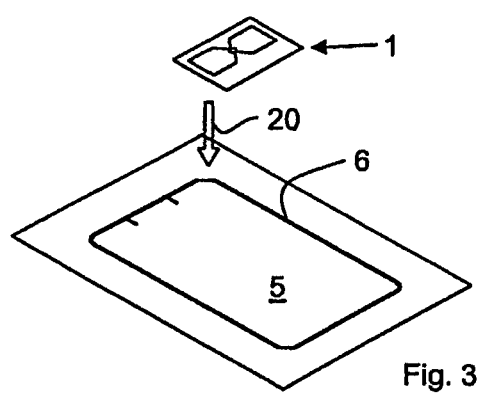
Figure 4:
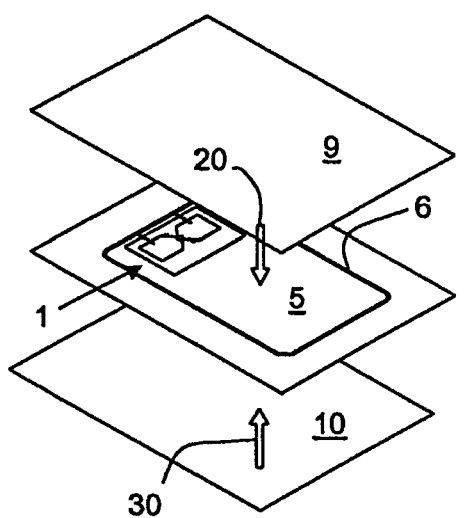

FIG. 1a schematically shows a module with a substrate, a chip and contact areas for the connection of the chip in a perspective view;

FIG. 1b schematically shows a module from FIG. 1a in a side view;

FIG. 2 schematically shows the arrangement of an antenna on a thermoplastic material in a perspective view;

FIG. 3 schematically shows the additional arrangement of the module represented in FIG. 1 in the arrangement as shown in FIG. 2 in a perspective view;

FIG. 4 schematically shows the lamination with a respective outer layer from above and below of the arrangement represented in FIG. 3 in a perspective view.

FIG. 1a schematically shows in a perspective view a module 1 of a sheet-like form with a nonconducting substrate 2 and a chip 3, which is arranged on the substrate 2. The chip 3 is connected to the substrate 2 by way of an electrically conductive film, which also has adhesive properties. In one embodiment of the invention, a silver paste (silver glue) may be used as the conductive film, serving at the same time as an adhesive for the mechanical connection of the chip 3 to the substrate 2. The chip 3 is mechanically connected to the substrate 2 by way of the conductive film. It may also be provided that the chip 3 is adhesively attached by means of an ACF (anisotropic conductive film) underneath the chip 3 between the latter and the substrate 2, independently of the conductive film.

Contact areas 4a, 4b are formed on the substrate 2 by the conductive film. The contact areas 4a, 4b are the connection points or connecting points for the chip 3. The connection points of the chip 3 are, as it were, led to the "outside" through the contact areas 4a, 4b. Simplified contacting of the chip 3 is obtained by way of the large contact areas 4a, 4b. To form a transponder comprising chip 3 and an antenna 6, the antenna 6 of the transponder can be connected by a respective end to one of the contact areas 4a, 4b.

The antenna 6 may be formed as a single-layer coil which has radially adjacent turns. In the exemplary embodiment represented in FIGS. 2, 3 and 4, the antenna 6 is formed as such a single-layer coil having radially adjacent turns.

The antenna may also take the form of an etched antenna. It is similarly possible for the antenna to take the form of a printed interconnect. The antenna may also have been created by electroplating. In the case of the aforementioned possibilities, it may be that the antenna has been applied to an electrically nonconducting substrate. For the purposes of the invention, an antenna on an electrically nonconducting substrate may also be used.

For the forming of a thin flexible spatial structure, in one exemplary embodiment of the invention the substrate 2 has a thickness of approximately 50 μm. The thickness of the substrate 2 with the applied conductive film is approximately 80 μm, and the thickness of the chip 3 is approximately 200 μm, resulting in a maximum thickness of the module 1 of approximately 250 μm. To illustrate the relative thicknesses, the module 1 that is shown in FIG. 1a is shown in a side view in FIG. 1b.

While the chip 3 has a spatial extent in the plane of the module 1 of approximately 1600 μm×1600 μm, the contact areas 4a, 4b have an area of at least approximately 9700 μm×9700 μm. The contact areas 4a, 4b represent a large-area connection capability for contacting of the chip 3, such as for example for the connection of the ends of the antenna, which is required for the forming of a transponder in a sheet-like spatial structure.

FIG. 2 shows a perspective view of a thermoplastic material 5 of a sheet-like configuration. The antenna 6, configured in the exemplary embodiment shown as a coil, comprises a metal wire wound in turns, in particular 5 to 8 turns. The turns of the coil are radially adjacent. The coil is formed in a rectangular manner with rounded corners. The coil has two ends 7, 8. The ends 7, 8 are led inward into the rectangular region bordered by the coil. In other exemplary embodiments, the coil may also be circular or have some other closed planar form.

An insulated metal wire, in particular insulated with enamel, may be used to form the coil. During the winding of the turns, the insulation of the metal wire may be at least partially brought into contact with a solvent and partially made to begin to dissolve. During the forming of the turns, the insulation of adjacent turns may be at least partially brought into mutual contact, while the wire of adjacent turns does not come into mutual contact, and then the solvent is vaporized. As a result of the insulation being partially made to begin to dissolve, the insulation of the adjacent turns of the coil sticks together with the partially dissolved and re-solidified insulations, so that a sheet-like single-layer coil can be formed, the adjacent turns of which are formed lying one against the other with their insulation. In another exemplary embodiment, it may also be provided that the turns of the coil do not touch. If the turns touch in the insulation, a coil with a small circumferential periphery is formed as a result.

According to the exemplary embodiment represented in FIG. 2, the coil is first placed on the thermoplastic material 5, which is illustrated by the arrow provided with the reference numeral 20.

After that, the module 1 is placed on the thermoplastic material 5 and the antenna 6 lying on top, formed here as a coil, which is illustrated in FIG. 3 by the arrow provided with the reference numeral 20. The module 1 is aligned in such a way that the contact areas 4a, 4b are facing the ends 7, 8 of the coil and cover them. The module 1 represented in FIG. 1 is turned with respect to FIG. 1 by 180° with reference to an axis parallel to the plane of the substrate 2, in order that a respective one of the contact areas 4a, 4b can touch an end 7, 8 of the coil.

In order that the chip 3 cannot be felt as an elevation in the sheet-like spatial structure, the chip 3 is arranged in a clearance in the thermoplastic material 5, or is guided into the clearance.

The ends 7, 8 of the coil are certain to touch the contact areas 4a, 4b of the module 1, on account of the size thereof, irrespective of certain production tolerances or displacements of one end 7, 8 of the coil, so that there is a connection between the chip 3 and the coil when the module 1 is placed on the thermoplastic material 5 and the coil lying on top. A mechanical connection is obtained between a respective one of the contact areas 4a, 4b and a respective end 7, 8 of the coil, a durable electrical connection being achieved.

FIG. 4 shows the coil and the module 1 placed on the thermoplastic material 5 as shown in FIG. 3. The contact areas 4a, 4b of the module 1 are arranged over the ends 7, 8 of the coil.

As schematically shown in FIG. 4, a respective outer layer 9, 10 is laminated by way of the two large areas of the thermoplastic material 5. The arrangement between the outer layers 9, 10 and the thermoplastic material is illustrated by the arrows provided with the reference numerals 20 and 30. The outer layer 9 is located above the thermoplastic material 5 represented. The outer layer 10 is located underneath the thermoplastic material 5 represented in FIG. 4. For the lamination, the thermoplastic material 5 comprises a polyvinyl chloride, PETG, polycarbonate or a combination thereof, or consists of such a thermoplastic material. The outer layer 9, 10 comprises Teslin, PVC, PETG, PC or a combination thereof, or consists of such a thermoplastic material.

To perform a protective function during the lamination, the substrate 2 comprises PET, PI, PV or a combination thereof, or consists of such material or a material combination.

By the lamination, the antenna 6 configured as a coil is pressed into the thermoplastic material 5 and at least partially embedded in it. The coil is arranged in the substantially planar surface area of the thermoplastic material 5. The chip 3 is arranged in the clearance in the thermoplastic material 5 and also does not form an elevation. The clearance in the thermoplastic material 5 may be formed as a punch-out passing through the thermoplastic material 5, since the punched out "hole" is closed by the lamination.

With the lamination, the module 1 with its substrate 2 and the chip 3 is fixed with the electrically conductive contact areas 4a, 4b over the ends 7, 8 of the coil, and a durable electrical connection of the coil to the chip 3 that is flexibly configured is achieved. The thermoplastic material 5 is arranged together with the module 1 and the coil in a sandwich-like manner between the outer layers 9, 10 or overlays.

In one exemplary embodiment, it may also be provided that the coil is first embedded in the thermoplastic material 5 by applying current. For this purpose, current is applied to the coil placed on the thermoplastic material 5 as shown in FIG. 2, so that the coil heats up on account of its electrical resistance. The local heating up of the coil by way of the current flowing in the coil leads to a softening of the thermoplastic material 1 and a sinking of the coil into the material 5 on account of the dead weight of the coil. It may also be provided that pressure is applied to the heated-up coil, for example by way of a punch, in order to exert an additional force in the direction of the softened thermoplastic material 5, which assists the sinking of the coil. In particular, the punch may be adapted to the form of the coil, so that pressure is only applied to the turns of the coil.

Applying current allows the coil to be heated up to preferably 80° C. to 120° C. for a few seconds. On account of the local heating-up, such short application of current is sufficient to soften the thermoplastic material 5 and allow the coil to sink in. The temperature reached as a maximum with the coil during the application of current may be chosen specifically such that the thermoplastic material 5 softens but a temperature that causes the metal wire to burn through is not reached. Polyvinyl chloride, which already softens at approximately 80° C., may be used for example as the thermoplastic material 5.

In order to produce flat spatial structures, in particular cards, the sheet-like thermoplastic material may have a thickness between 0.2 mm and 0.4 mm. The metal wire may comprise a copper wire, the thickness of which is adapted to the thickness of the thermoplastic material 5, so that it is thinner than the latter, in order to be embedded at least partially, preferably completely, in the thermoplastic material 5. The metal wire may have a thickness of less than 0.25 mm, more preferably a thickness below 0.1 mm, particularly preferably a thickness between 0.02 mm and 0.08 mm.

The invention claimed is:

1. A spatial structure with a transponder, comprising:
    an antenna of a flat construction and a chip operably connected to the antenna, the antenna including two ends and being at least partially embedded in a thermoplastic sheet material of the spatial structure, wherein the thermoplastic sheet material comprises polyvinyl chloride, PETG, polycarbonate or a combination thereof and includes two major surfaces, and wherein the chip is pressed into one of the major surfaces during lamination for partially receiving the chip,
    a sheet module comprising a nonconducting substrate that is positioned on the thermoplastic sheet material so as to be on one of the major surfaces, the sheet module further comprising an electrically conductive film that is positioned on the nonconducting substrate and includes contact areas to which the ends of the antenna are connected to electrically couple the chip to the antenna, wherein the contact areas are also positioned on the major surface and orientated to the ends of the antenna to facilitate a connection to the ends of the antenna, wherein the substrate comprises a material that does not melt during lamination of the thermoplastic sheet material such that the substrate does not laminate with the thermoplastic sheet material, and wherein the substrate comprises PET, PI, PV or a combination thereof; and
    wherein the thermoplastic sheet material is positioned between two outer layers that are separate from the substrate in a sandwich-like manner together with the module during the lamination such that the contact areas of the electrically conductive film are aligned with the ends of the antenna, and the antenna between the two outer layers.

2. The spatial structure as claimed in claim 1, wherein the electrically conductive film comprises conductive silver paste.

3. The spatial structure as claimed in claim 1, wherein the thermoplastic material comprises polyvinyl chloride, PETG, polycarbonate or a combination thereof.

4. The spatial structure as claimed in claim 1, wherein the material for the outer layers comprises Teslin, PVC, PETG, PC or a combination thereof.

5. The spatial structure as claimed in claim 1, wherein the thermoplastic sheet material is in card form and has a thickness of between 0.2 mm and 0.4 mm.

6. A method for the manufacture of a spatial structure with a transponder which has an antenna of a flat construction and a chip connected to the antenna, the antenna being at least partially embedded in a thermoplastic sheet material of the spatial structure, wherein the thermoplastic sheet material includes two major surfaces, the method comprising:
    placing the antenna on the thermoplastic sheet material, wherein the thermoplastic material comprises polyvinyl chloride, PETG, polycarbonate or a combination thereof, the antenna having two ends;
    providing a sheet module, the sheet module having an electrically nonconducting substrate and an electrically conductive film having contact areas placed atop the nonconducting substrate, wherein the chip is positioned at least partially on the electrically conductive film, and wherein the nonconducting substrate comprises PET, PI, PV or a combination thereof;
    positioning the sheet module onto one of the major surfaces of the thermoplastic sheet material such that the contact areas are also positioned on the major surface and orientated to the ends of the antenna,
    connecting the ends of the antenna to the contact areas of the electrically conductive film to couple the antenna to the chip;
    placing the thermoplastic sheet material, which supports the antenna and the sheet-like module, between two outer layers, and
    laminating the two outer layers together using heat and pressure such that the thermoplastic sheet material melts to permit the sheet module to be pressed into the major surface, and wherein the sheet module does not melt during lamination.

7. The method as claimed in claim 6, wherein the conductive silver paste is used as the electrically conductive film.

8. The method as claimed in claim 6, wherein Teslin, PVC, PETG, PC or a combination thereof is used as the material for the outer layers.

9. The method as claimed in claim 6, wherein a film in card form with a thickness of between 0.1 mm and 0.4 mm is used as the thermoplastic sheet material.

10. The spatial structure as claimed in claim 1, wherein the contact areas are disposed on opposing sides of the chip such that one end of the antenna is coupled to one of the contact areas on one side of the chip and the other end of the antenna is coupled to the other contact area on an opposing side of the chip.

11. The spatial structure as claimed in claim 1, wherein the contact areas have an area of at least about 9700 μm by 9700 μm to provide a relatively large surface area to which to couple the ends of the antenna.

12. The method as claimed in claim 6, wherein the contact areas are disposed on opposing sides of the chip, and wherein the chip is placed onto the film such that one end of the antenna is coupled to one of the contact areas on one side of the chip and the other end of the antenna is coupled to the other contact area on an opposing side of the chip.

13. The method as claimed in claim 6, wherein the contact areas have an area of at least about 9700 μm by 9700 μm to provide a relatively large surface area to which to couple the ends of the antenna.

14. A spatial structure with a transponder, comprising:
an antenna comprising a wire of a flat construction that is configured as a complete coil that circumscribes an open center and a chip operably connected to the antenna, the antenna including two end sections that extend inward toward the open center and being at least partially embedded in a thermoplastic sheet material of the spatial structure, wherein the thermoplastic sheet material includes two major surfaces, and wherein the chip is pressed into one of the major surfaces during lamination for partially receiving the chip, wherein the thermoplastic sheet material comprises polyvinyl chloride, PETG, polycarbonate or a combination thereof;

a sheet module comprising a nonconducting substrate that is positioned on the thermoplastic sheet material and within the open center so as to be on one of the major surfaces, the sheet module further comprising an electrically conductive film that is positioned on the nonconducting substrate and includes contact areas to which the end sections of the antenna are connected to electrically couple the chip to the antenna, wherein the contact areas are also positioned on the major surface and orientated to the end sections of the antenna to facilitate a connection to the end sections of the antenna, wherein the substrate comprises a material that does not melt during the lamination of the thermoplastic sheet material such that the substrate does not laminate with the thermoplastic sheet material, wherein the substrate comprises PET, PI, PV or a combination thereof; and wherein the thermoplastic sheet material is positioned between two outer layers in a sandwich-like manner together with the module during the lamination such that the contact areas of the electrically conductive film are aligned with the end sections of the antenna, and the antenna between the two outer layers.

* * * * *